Dec. 28, 1965     S. GERESY     3,226,133
TRAILER HITCH LOCKING DEVICE
Filed June 26, 1962     3 Sheets-Sheet 1

INVENTOR.
STEVE GERESY,
BY *Linton and Linton*
ATTORNEYS.

Dec. 28, 1965 S. GERESY 3,226,133
TRAILER HITCH LOCKING DEVICE
Filed June 26, 1962 3 Sheets-Sheet 2

INVENTOR.
STEVE GERESY,
BY
Linton and Linton
ATTORNEYS.

Dec. 28, 1965  S. GERESY  3,226,133
TRAILER HITCH LOCKING DEVICE
Filed June 26, 1962  3 Sheets-Sheet 3
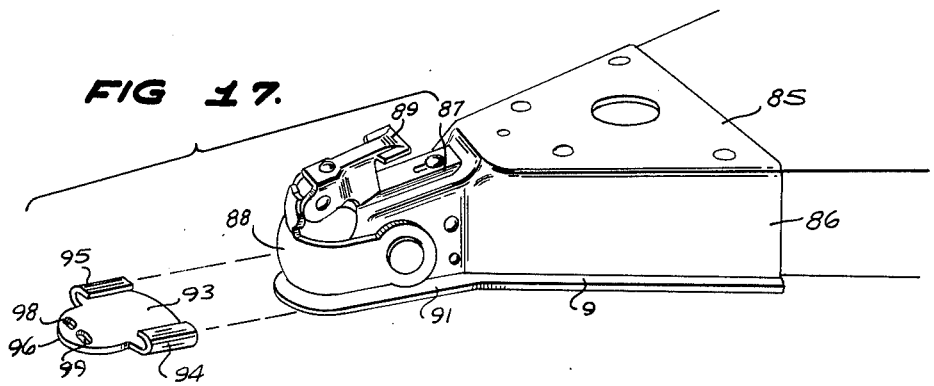
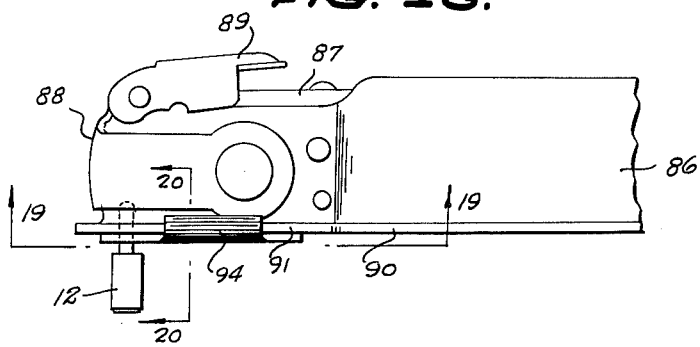
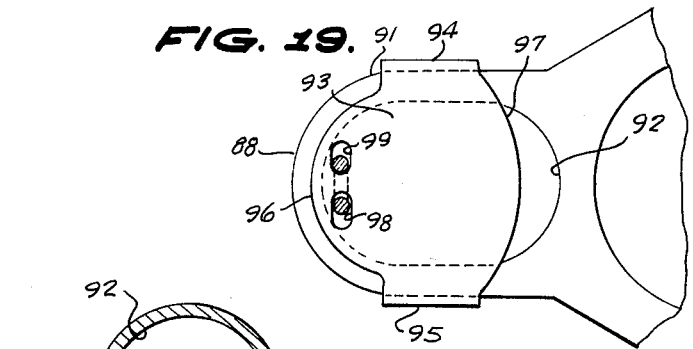
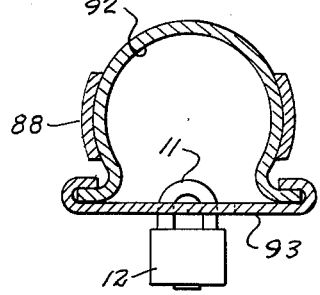
INVENTOR.
STEVE GERESY,
BY
Linton and Linton
ATTORNEYS.

United States Patent Office 3,226,133
Patented Dec. 28, 1965

3,226,133
TRAILER HITCH LOCKING DEVICE
Steve Geresy, Taylor, Mich.
(1115 Holden Ave., Orlando, Fla. 32809)
Filed June 26, 1962, Ser. No. 205,258
4 Claims. (Cl. 280—507)

The present invention relates to hitches for house, boat, travel, camp, luggage and the like trailers and is more particularly concerned with means for preventing the unauthorized connection of trailer hitches to a prime mover.

The principal object of the present invention is to provide devices for use in combination with existing trailer hitches already connected to a trailer for preventing an unauthorized person from connecting a towing vehicle to the hitch when the trailer is temporarily disconnected from its own prime mover as when parked.

Another and important object of the invention is to provide a trailer hitch lock for conventional ball type hitches to prevent the unauthorized joining thereof to a towing vehicle and which locks are universally adaptable for use on all types of known hitches.

Further objects of the invention will be in part obvious and in part pointed out in the following description of the accompanying drawings in which:

FIGURES 17 to 20 are exploded perspective, side, and cross-sectional views taken on lines 19—19 and 20—20 of FIGURE 18, respectively.

Figure 1:
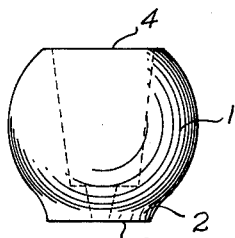
FIGURE 1 is a side elevation of a locking ball in accordance with the present invention.
Figure 2:
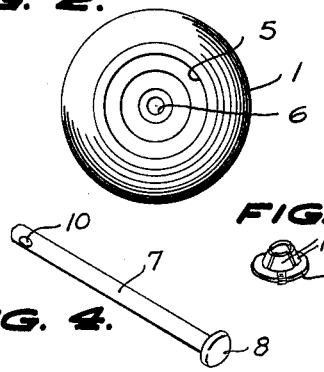
FIGURE 2 is a top view of said ball.
Figure 3:
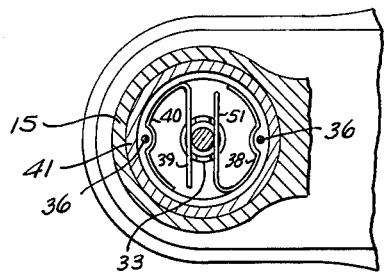
FIGURE 3 is a perspective view of a lock washer for use in said ball.
Figure 4:
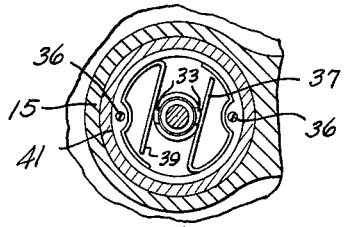
FIGURE 4 is a perspective view of a pin for use with said ball.

Referring now more particularly to the accompanying drawings in which like and corresponding parts are designated by similar reference characters, numeral 1 indicates a locking ball having a bottom appendage 2 with a flat bottom 3 and a flat top 4. An inner recess 5 is open at top 4 and communicates with a tapered bore 6 in said appendage opening in bottom 3.

A locking pin 7 has a head 8, a washer 9 and opening 10 for receiving bow 11 of a padlock 12 and a lock washer 13 having inwardly and upwardly extending resilient fingers 14.

Figure 5:
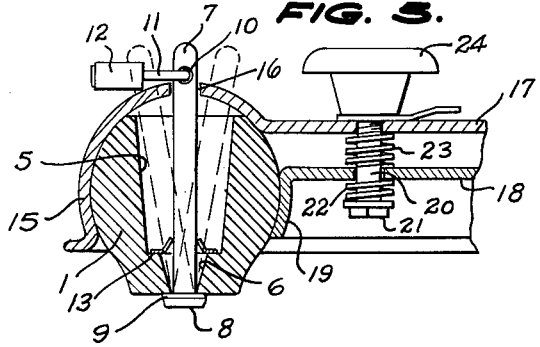
FIGURE 5 is a cross-sectional view of a portion of a conventional trailer hitch with the locking ball therein.
Figure 6:
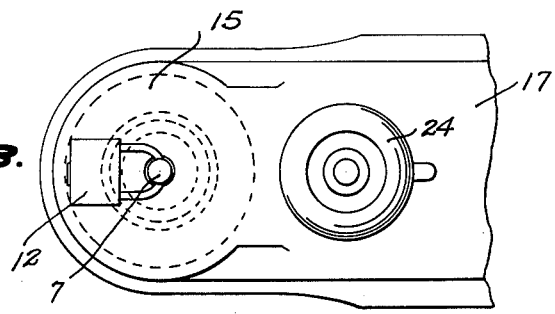
FIGURE 6 is a top view of FIGURE 5.

As shown in FIGURES 5 and 6 ball 1 is sized to completely fit within the partly spherical open bottom end 15 of a conventional trailer hitch which has been modified with top opening 16. Such hitches have a top 17, a plate 18 with curved end 19, a pin 20 with head 21, a spring 22 between said head and plate, a second spring 23 between said plate and said top and an enlarged end 24.

By inserting ball 1 within end 15, extending pin 7 through said ball and opening 16 and inserting bow 11 through opening 10 and into padlock 12, said hitch cannot be connected to the conventional ball connector of a prime mover for the trailer until said ball is removed. Washer 13 retains pin 7 in said ball due to fingers 14 engaging said pin.

Figures 7, 8, 9:
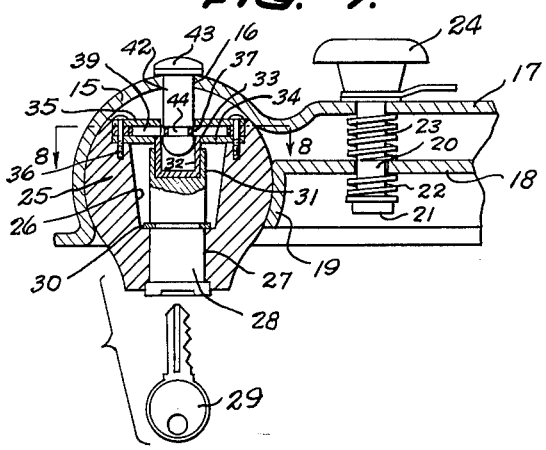
FIGURE 7 is a cross-sectional view of a modified form of locking ball mounted in the trailer hitch.
FIGURE 8 is a cross-sectional view taken on line 8—8 of FIGURE 7 with the ball in the locked condition.
FIGURE 9 is a cross-sectional view similar to FIGURE 8, but with the ball in its unlocked condition.

In FIGURES 7 to 9 a modified form of ball 25 is shown which has a recess 26 open at the top, a bore 27 through which extends a conventional tumbler lock 28 to be unlocked by the insertion and turning of key 29.

A ring 30 keyed into the lock 28 prevents the removal thereof. The inner end 31 of said lock has a U-shaped member 32 mounted therein and connected thereto for being turned by key 29. Said member 32 has a pair of longitudinally extending fingers 33.

A pair of superimposed plates 34 and 35 having central openings are fixedly mounted on ball 25 extending across recess 26, by screws 36 and spaced apart by ring 41 therebetween.

A spring 37 has a curved portion 38 abutting ring 41 while a similar spring 39 has its curved portion 40 abutting an opposite side of said ring. Fingers 33 extend between said springs 37 and 39.

A pin 42 having a head 43 and an annular recess 44 is sized to extend between springs 37 and 39 pushing the same apart until they enter recess 44 as shown in FIGURE 8 for retaining said pin in said ball. Rotation of key 29 and thus fingers 33 pushes said springs apart as shown in FIGURE 9 moving the same from recess 44 releasing pin 42.

Ball 25 also is sized to completely fit in end 15 of the trailer hitch and by inserting pin 42 through opening 16 and between springs 37 and 39 said ball is locked in said end 15 preventing the insertion of a ball of a connector therein and thus the trailer hitch cannot be connected to prime movers for having the trailer moved by unauthorized persons. Inserting key 29 in lock 28 and turning the same permits the withdrawal of pin 42 and ball 25 from said hitch.

Figure 10:
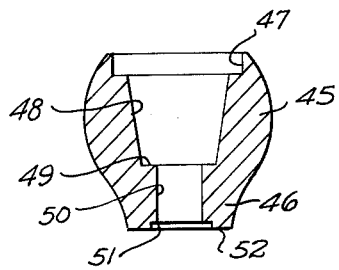
FIGURE 10 is a cross-sectional view of a third form of locking ball.
Figure 12:
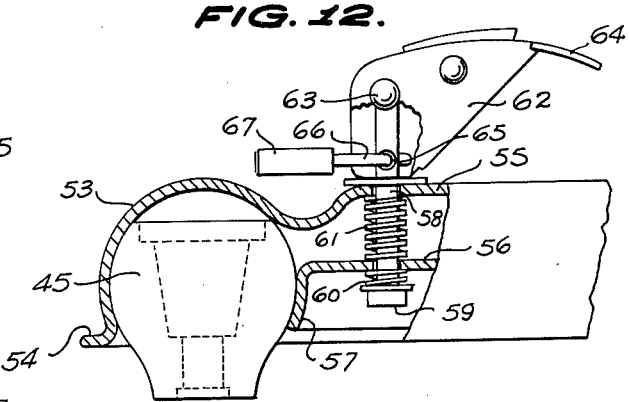
FIGURE 12 is a partial cross-sectional view of a conventional trailer hitch with said third form of ball therein.
Figure 11:
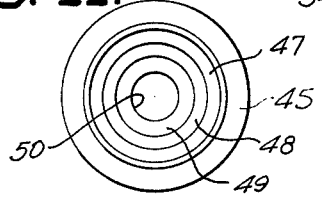
FIGURE 11 is a top view of said ball.

A ball 45 similar to ball 25 is shown in FIGURES 10 and 11 which can be used without a locking pin 42 in certain types of known hitches as shown in FIGURE 12. Ball 45 has an annular top recess 47, intermediate tapered recess 48, step 49, bottom bore 50, bottom recess 51 and appendage flat bottom 52 so that the locking elements of ball 25 can be added thereto.

However the plain ball 45 can be inserted in the spherical open bottom end 53 of a hitch having a lateral bottom flange 54, top 55, plate 56 with curved end 57, pin 58 with head 59, spring 60 between head 59 and plate 56, spring 61 between top plate 55 and plate 56, cam 62 pivotally connected by axle 63 to pin 58 and having operating handle 64 as well as opening 65 for the bow 66 of a padlock 67.

Ball 45 completely fills end 53 and when bow 66 is extending through opening 65, said cam 62 cannot be pivoted to release plate 56 thus retaining ball 45 in end 53 preventing the attachment of a ball connector to said hitch.

Figure 13:
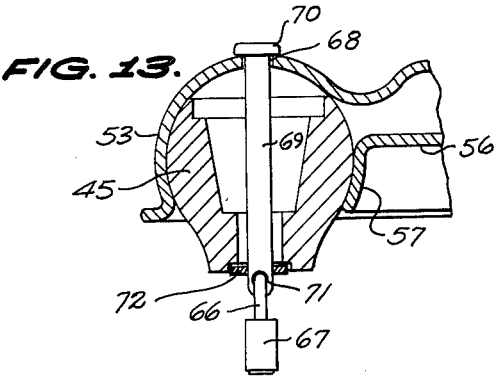
FIGURE 13 is a cross-sectional view of said third form of ball in a trailer hitch with locking pin.

Ball 45 can also be used in a hitch such as shown in FIGURES 5 and 7 or FIGURE 13 when modified having an opening 68 in the top thereof. As shown in FIGURE 13 ball 45 is inserted in end 53. A pin 69 having head 70 is inserted through opening 68 and said ball and through a washer 72 in recess 51. Bow 66 of padlock 67 is inserted through opening 71 in said pin locking ball 45 in end 53 until said padlock is removed.

Figure 14:
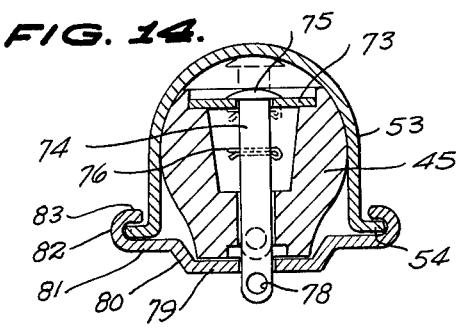
FIGURE 14 is a lateral cross-sectional view of a hitch with said ball and locking plate mounted thereon.
Figure 15:
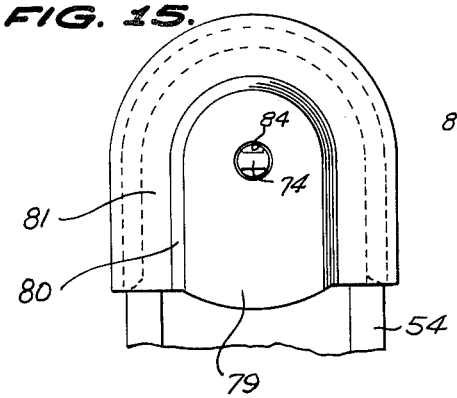
FIGURE 15 is a bottom view of said locking plate on the hitch.
Figure 16:
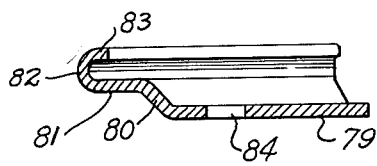
FIGURE 16 is an enlarged cross-sectional view of a portion of said locking plate.

Ball 45 can also be locked in said hitches in the manner shown in FIGURES 14–16 wherein, for example, hitch end 53 is shown with ball 45 therein. A washer 73 is mounted in recess 47, pin 74 having a head 75, extends through said washer 73 and said ball.

A plate 79 having a slanting portion 80 and a J-shaped marginal portion provided by flat section 81, curved section 82 and flat end 83 parallel to section 81, is slid into flange 54 of the hitch closing the open bottom of end 53. Pin 74 is allowed to drop through opening 84 in said plate whereupon bow 66 of padlock 67 can be passed through opening 78 of said pin locking said plate in position.

A cotter pin 76 extends laterally through pin 74 retaining the same with washer 73.

Thus hitch 53 cannot be used for towing purposes until padlock 67, bow 66, plate 79 and ball 45 are removed therefrom.

The modification shown in FIGURES 17 to 20 inclusive includes a conventional trailer hitch including a top plate 85, inwardly tapering sides 86 meeting in end portion 87 upon which is pivotally mounted a U-shaped strap end 88 upon which is pivotally mounted a locking handle 89. Sides 86 have lateral lower edge flanges 90 which meet with flange 91 extending around the lower edge of end portion 87–88. Normally a ball hitch is inserted in end 88 for drawing a trailer connected to plate 85.

To prevent the use of said hitch, a plate 93 having curved ends 96 and 97 and oppositely curved side portions 94 and 95 capable of slideably receiving flange 91, is slid onto flange 91 covering the interior 92 of end 88 whereupon the bow 11 of padlock 12 is inserted through openings 98 and 99 and into padlock 12. Thus plate 93 cannot be removed from the hitch until bow 11 and padlock 12 are removed from said plate.

The present device is capable of considerable modification and such changes thereto as come within the scope of the appended claims is deemed a part of the invention.

I claim:

1. An unauthorized use preventing device for trailer hitches comprising in combination a trailer hitch having a spherical end with an open bottom and a top opening, a ball detachably mounted in said hitch end and having a bore therethrough, a pin extending through said hitch top opening into said ball bore and means for locking said pin to said ball.

2. An unauthorized use preventing device for trailer hitches comprising in combination a trailer hitch having a spherical end with an open bottom and a top opening, a ball detachably mounted in said hitch end and having a bore therethrough, a pin detachably extending through said ball bore and hitch top opening, a head on said pin abutting said ball being larger than said ball bore at the point of abutment and means detachably locked on said pin preventing its withdrawal through said hitch top opening.

3. An unauthorized use preventing device for trailer hitches comprising in combination a trailer hitch having a spherical end with an open bottom and a top opening, a ball detachably mounted in said hitch end and having a bore therethrough, a pin detachably extending through said ball bore and hitch top opening, said pin having a head abutting said ball being larger than said ball bore at the point of abutment and an opening in its end, and locking means extending through said pin opening preventing its withdrawal through said hitch top opening.

4. An unauthorized use preventing device for trailer hitches comprising in combination a trailer hitch having a spherical end with open bottom and a top opening, a ball detachably mounted in said hitch end and having a bore therethrough, a tumbler lock extending into said ball bore, a pair of superimposed spaced plates each having a central opening and being fixedly mounted on said ball extending across said ball bore, a pair of resilient members mounted between said plates, a pair of fingers connected to said lock for being rotated thereby and extending between said resilient members for moving said members apart when said fingers are rotated, a pin extending through said hitch top opening to and between said resilient members, a head on said pin abutting said hitch end limiting the movement of said pin into said hitch end, and said pin having a side recess receiving said resilient members for being retained thereby until said resilient members are moved apart by said fingers.

References Cited by the Examiner

UNITED STATES PATENTS 2,571,349  10/1951  Eckles _____ 280—507 X
3,139,291  6/1964  Geresy _____ 280—507

LEO FRIAGLIA, *Primary Examiner.*

A. HARRY LEVY, *Examiner.*